's Patent

United States Patent [19]
Marion et al.

[11] 3,868,817
[45] Mar. 4, 1975

[54] GAS TURBINE PROCESS UTILIZING PURIFIED FUEL GAS

[75] Inventors: Charles P. Marion, Mamaroneck, N.Y.; Warren G. Schlinger, Pasadena, Calif.; Albert Brent, Dix Hills; James R. Muenger, Beacon, both of N.Y.

[73] Assignee: Texaco Inc., New York, N.Y.

[22] Filed: Dec. 27, 1973

[21] Appl. No.: 428,981

[52] U.S. Cl............... 60/39.02, 60/39.05, 60/39.12, 60/39.46, 48/215, 252/373, 60/39.18 B
[51] Int. Cl............................................. F02b 43/12
[58] Field of Search............ 60/39.12, 39.46, 39.02, 60/39.05, 39.52, 39.18 B; 48/215, 213, 206

[56] References Cited
UNITED STATES PATENTS

| | | | |
|---|---|---|---|
| 2,614,915 | 10/1952 | Hirsch | 60/39.12 |
| 3,002,347 | 10/1961 | Sprague | 60/39.12 |
| 3,020,715 | 2/1962 | Thomsen | 60/39.12 |
| 3,446,014 | 5/1969 | Foster-Pegg | 60/39.18 B |
| 3,556,751 | 1/1971 | Slater et al. | 48/214 |
| 3,565,588 | 2/1971 | Reynolds et al. | 48/215 |
| 3,620,699 | 11/1971 | Reynolds et al. | 48/213 |
| 3,709,669 | 1/1973 | Marion et al. | 48/215 |
| 3,759,036 | 9/1973 | White | 60/39.05 |
| 3,816,332 | 6/1974 | Marion | 48/215 |

*Primary Examiner*—C. J. Husar
*Assistant Examiner*—Warren Olsen
*Attorney, Agent, or Firm*—T. H. Whaley; C. G. Ries

[57] ABSTRACT

Gas turbines for producing mechanical and electrical power without polluting the atmosphere are fueled by an improved clean fuel gas having a heat of combustion in the range of about 75–350 BTU/SCF and a mole ratio $(CO/H_2)$ of at least 0.30. The fuel-gas is produced by partial oxidation of a hydrocarbonaceous fuel in a free-flow noncatalytic fuel-gas generator. Feedstock to the fuel-gas generator may include high ash, high sulfur, hydrocarbonaceous fuels. Pollutants are separated from the process stream of fuel gas, and a $CO_2$— rich stream is recovered. The $CO_2$-rich stream may be used either as a portion of the temperature moderator in the gas generator or in a noncatalytic, thermal, reverse water-gas shift reaction with hydrogen in the process fuel gas stream to increase the mole ratio $(CO/H_2)$, or for both purposes. Sensible heat in the clean fuel gas leaving the gas turbine may be recovered by superheating steam. The superheated steam may be used as the working fluid in a steam turbine used to drive an electric generator or a turbocompressor or both. At least a portion of the clean flue gas leaving the turbine may be introduced into the gas generator as a temperature moderating gas. The remainder of the clean flue gas may be safely discharged to the atmosphere without causing pollution.

24 Claims, 1 Drawing Figure

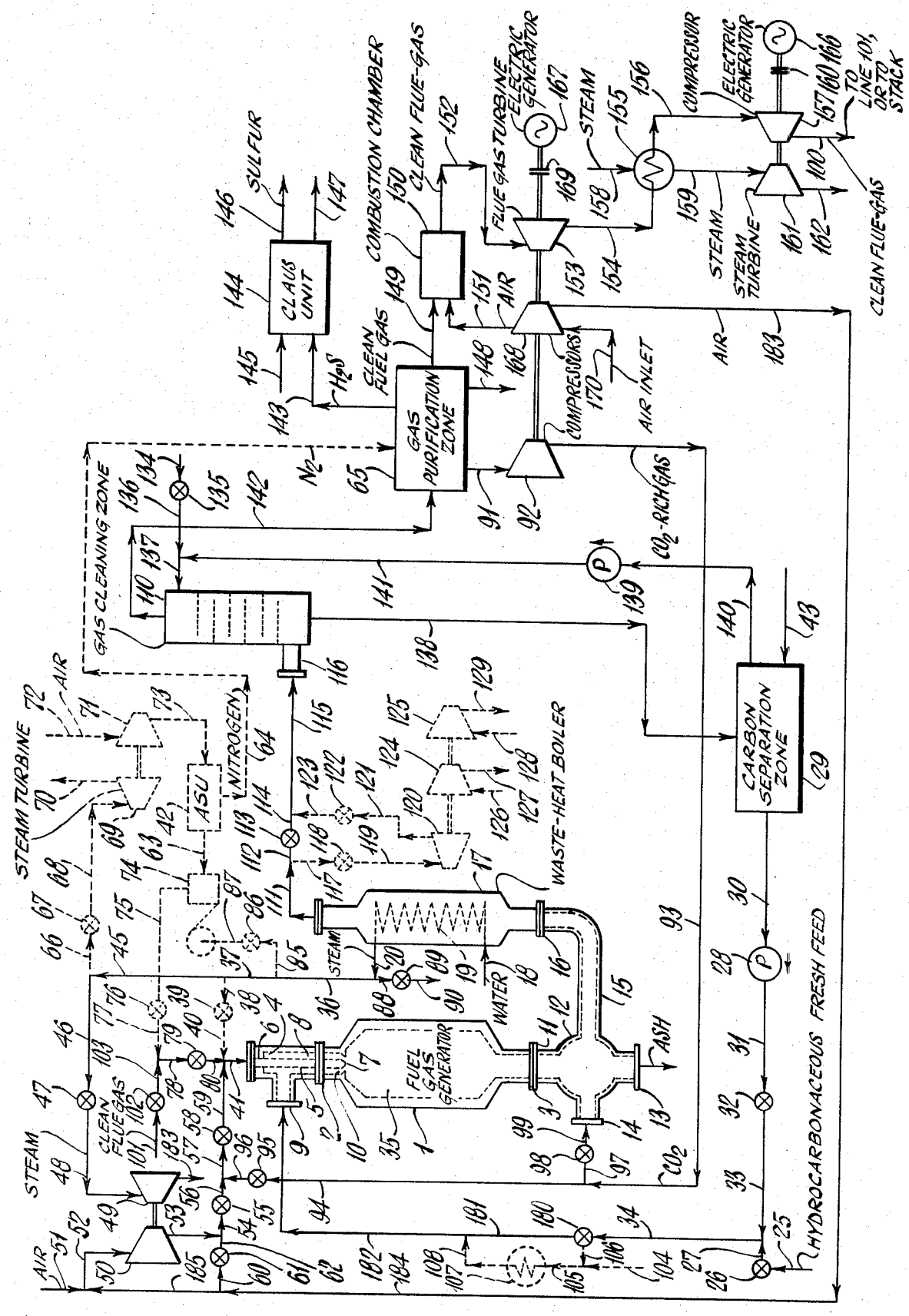

GAS TURBINE PROCESS UTILIZING PURIFIED FUEL GAS

BACKGROUND OF THE INVENTION

1. Field of the Invention

This invention pertains to the production and the burning of clean fuel gas in gas turbines. More specifically it relates to the production of an improved fuel gas from ash and sulfur-containing carbonaceous fuels and to the use of said improved fuel gas in gas turbines for the production of mechanical and electric power with substantially no associated environmental pollution.

2. Description of the Prior Art

The sequence of operations in a conventional gas turbine of the simplest type includes compressing air by a centrifugal or axial compressor, burning a fuel with said compressed air in a combustion chamber, and passing the hot gases produced through an expansion turbine. Some of the turbine power may be used to drive a compressor which may be attached to the same shift. The remaining turbine power is commonly transmitted to a generator for producing electrical energy.

While as shown in the prior art, it may be economically desirable to fire low grade coal and residual oil fuels directly in the combustion chamber of a gas turbine, it has not been proven practical to do so when the fuels contain high amounts of ash of sulfur. Due to incomplete combustion, such high ash solid fuels generally release solid abrasive and corrosive particles. When such particles are entrained in flue gas that is passed through an expansion turbine, they deposit on the turbine blades and erode the blade surfaces. When this erosion occurs, blade form is spoiled; and gas passages in the in the turbine are clogged. Further, the fine particles may deposit on downstream heat-exchange surfaces where the resulting insulation will impair thermal efficiency. Similar problems are encountered when burning ash producing liquid petroleum products. Such ash includes mineral compounds, as those found in crude oil. These compounds are concentrated in the residuals by the refining process and are supplemented by silica, iron, and sodium compounds which are picked up in shipment and handling. Vanadium, nickel, sodium, sulfur, and oxygen are the major components of the ash. After burning, they appear as metallic oxides, sulfates, vanadates and silicates of sodium. These compounds appear to erode the protective oxide films of high temperature alloys. Oxidation is thereby accelerated, especially above about 1200°F. Further, $H_2S$ and COS in the flue gas exhaust from the expansion turbine pollute the atmosphere. Previous methods in which the fuel gas was cleaned prior to being introduced into the gas turbine were either impractical, unduly costly, or both.

The aforesaid problems are substantially avoided by the subject invention which integrates the gas turbine and a partial oxidation fuel gas generator in a highly efficient process for producing power without polluting the atmosphere.

SUMMARY

The subject process pertains to the generation of mechanical and electrical power using a gas turbine fueled by an improved fuel gas. The fuel gas may be produced by the noncatalytic partial oxidation of a low cost, high sulfur, high ash, hydrocarbonaceous fuel. The improved fuel gas produced has a heat of combustion in the range of about 75 to 350 BTU/Lb. and a mole ratio $(CO/H_2)$ of at least about 0.30. When combusted in the gas turbine, there is substantially no associated environmental pollution.

The process consists essentially of the following steps:

1. reacting a hydrocarbonaceous fuel with a free-oxygen containing gas by partial oxidation in the presence of a temperature moderator selected from the group consisting of at least a portion of the $CO_2$-rich gas stream from step (3), at least a portion of the exhaust flue gas from step (4), and mixtures thereof in the reaction zone of a non-catalytic free-flow gas generator at an autogenous temperature in the range of about 1500° to 3500°F. and a pressure in the range of about 10 to 180 atmospheres absolute to produce an effluent gas stream comprising mixtures of $H_2$, CO, $CO_2$, and $H_2O$ and one or more of the members of the group $N_2$, $CH_4$, COS, $H_2S$ and Ar, and particulate carbon; and wherein the mole ratio $(CO/H_2)$ dry basis of the effluent gas from the generator is at least 0.30;

2. cooling the effluent gas from (1) by indirect heat exchange with water thereby producing stream;

3. introducing the cooled effluent gas from (2) into a gas cleaning and purification zone and separately obtaining therefrom a stream of clean fuel gas comprising mixtures of $H_2$ and CO and one or more members of the group $CH_4$, $N_2$, $H_2O$, and $CO_2$; a $CO_2$-rich gas stream; a slurry stream comprising particulate carbon in a liquid vehicle; and optionally a gas stream comprising $H_2S$ and COS; and 4. burning the stream of clean fuel gas from (3) with air in the combustion chamber of said gas turbine and passing the resulting flue gas as the working fluid through said expansion turbine to develop power and to produce exhaust flue gas.

Optionally, at least a portion of the exhaust flue gas from the gas turbine is compressed to a pressure slightly above that of the gas generator in step (1) and then introduced therein as at least a portion of said temperature moderator, preferably in admixture with the free-oxygen containing stream.

DESCRIPTION OF THE INVENTION

The present invention pertains to an improved continuous process for producing thermal, electrical, and mechanical power by means of a gas turbine. Hydrocarbonaceous materials, including liquid and solid fuels containing a comparatively high content of ash and sulfur, may be used to produce a fuel gas in a separate noncatalytic free-flow partial oxidation synthesis gas generator.

The composition of the fuel gas may be further upgraded, for burning in a gas turbine integrated downstream in the process, by the steps of reverse thermal shift, cooling by indirect heat exchange with water in a waste-heat boiler thereby making steam, and cleaning and purifying to remove solid suspended matter and sulfur compounds. The resulting improved fuel gas is then burned with air in the combustion chamber of a gas turbine to produce clean flue gas. As will be further described, the clean flue gas is passed into an expansion turbine as the working fluid, and power is produced. Shaft power from the expansion turbine may be used to operate an electric generator, to compress air for introduction into the combustion chamber of said gas turbine, and to compress $CO_2$ for the noncatalytic thermal shift. The sensible heat in the clean flue gas exhaust from the gas turbine may be discharged into the atmosphere with substantially no associated environmental pollution. By keeping the heating value of the improved fuel gas in the range of about 75 to 350 BTU/SCF, the amount of oxides of nitrogen ($NO_x$) in the flue gas may be kept below 10 parts per million.

In the subject process, first a continuous stream of fuel gas is produced in the refractory lined reaction zone of a separate free-flow unpacked noncatalytic partial oxidation fuel gas generator. The gas generator is preferably a vertical steel pressure vessel, such as shown in the drawing and described in coassigned U.S. Pat. No. 2,992,906 issued to F. E. Guptill, Jr.

A wide range of combustible carbon containing organic materials may be reacted in the gas generator with a free-oxygen containing gas in the presence of a temperature-moderating gas to produce the fuel gas.

The term hydrocarbonaceous as used herein to described various suitable feedstocks is intended to include gaseous, liquid, and solid hydrocarbons, carbonaceous materials, and mixtures thereof. In fact, substantially any combustible carbon containing organic material, or slurries thereof, may be included within the definition of the term "hydrocarbonaceous." For example, there are (1) pumpable slurries of solid carbonaceous fuels, such as coal, particulate carbon, petroleum coke, concentrated sewer sludge, and mixtures thereof; (2) gas-solid suspensions, such as finely ground solid carbonaceous fuels dispersed in either a temperature-moderating gas or in a gaseous hydrocarbon; and (3) gas-liquid-solid dispersions, such as atomized liquid hydrocarbon fuel or water and particulate carbon dispersed in a temperature-moderating gas. The hydrocarbonaceous fuel may have a sulfur content in the range of about 0 to 10 weight percent and an ash content in the range of about 0 to 15 weight percent.

The term liquid hydrocarbon, as used herein to describe suitable liquid feedstocks, is intended to include various materials, such as liquefied petroleum gas, petroleum distillates and residues, gasoline, naphtha, kerosine, crude petroleum, asphalt, gas oil, residual oil, tar-sand and shale oil, coal oil, aromatic hydrocarbons (such as benzene, toluene, xylene fractions), coal tar, cycle gas oil from fluid-catalytic-cracking operation, furfural extract of coker gas oil, and mixtures thereof. Gaseous hydrocarbon fuels, as used herein to describe suitable gaseous feedstocks, include methane, ethane, propane, butane, pentane, natural gas, water-gas, coke-oven gas, refinery gas, acetylene tail gas, ethylene off-gas, synthesis gas, and mixtures thereof. Both gaseous and liquid feeds may be mixed and used simultaneously and may include paraffinic, olefinic, naphthenic, and aromatic compounds in any proportion.

Also included within the definition of the term hydrocarbonaceous are oxygenated hydrocarbonaceous organic materials including carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

The hydrocarbonaceous feed may be at room temperature; or it may be preheated to a temperature up to as high as about 600° to 1200°F., but preferably below its cracking temperature. The hydrocarbonaceous feed may be introduced into the burner in liquid phase or in a vaporized mixture with a temperature moderator. Suitable temperature moderators include $H_2O$, $CO_2$, a portion of the cooled clean flue gas exhaust from a gas turbine employed downstream in the process, by-product nitrogen from the air separation unit to be further decribed, and mixtures of the aforesaid temperature moderators.

The use of a temperature moderator to moderate the temperature in the reaction zone depends in general on the carbon to hydrogen ratio of the feedstock and the oxygen content of the oxidant stream. A temperature moderator may not be required with some gaseous hydrocarbon fuels; however, generally one is used with liquid hydrocarbon fuels and with substantially pure oxygen. Preferably, a $CO_2$-containing gas stream e.g. at least about 3 mole percent $CO_2$ (dry basis) in the absence of supplemental $H_2O$ is used as the temperature moderator. By this means, the mole ratio ($CO/H_2$) of the effluent product stream may be increased. As previously mentioned, the temperature moderator may be introduced in admixture with either or both reactant streams. Alternatively, the temperature moderator may be introduced into the reaction zone of the gas generator by way of a separate conduit in the fuel burner.

In accordance with the subject invention, the mole ratio ($CO/H_2$) of the product gas used as fuel in a gas turbine may be increased. By this means a higher pressure ratio per turbine stage may be obtained, and less stages are therefore required. The size of the turbine is decreased, and its thermodynamic efficiency is increased. The use of a $CO_2$-containing temperature moderating gas stream e.g. substantially pure $CO_2$ (at least 95 mole percent $CO_2$ dry basis) recycle from the gas purification zone to be further described, a portion of the clean flue gas exhaust (at least 3 mole percent $CO_2$ dry basis) from the gas turbine to be further described, or mixtures thereof is preferred, while the use of supplemental $H_2O$ is minimized and preferably omitted. Thus, advantageously the $CO_2$ produced in the system may be used as a temperature moderator or may be used in the reverse thermal shift step to be further described, or may be used in both places.

When comparatively small amounts of $H_2O$ are charged to the reaction zone, for example through the burner to cool the burner tip, the $H_2O$ may be mixed with either the hydrocarbonaceous feedstock, the free-oxygen containing gas, the temperature moderator, or combinations thereof. The weight ratio of water to hydrocarbonaceous feed may be in the range of about 0.0 to 1.0 and preferably 0.0 to less than 0.2.

The term free-oxygen containing gas, as used herein is intended to include air, oxygen-enriched air, i.e., greater than 21 mole percent oxygen, and substantially pure oxygen, i.e. greater than 95 mole percent oxygen, (the remainder comprising $N_2$, Ar, and rare gases). Substantially pure oxygen may be used when it is desired to reduce the amount of $N_2$ and Ar in the effluent gas stream from the generator. Free-oxygen containing gas may be introduced into the burner at a temperature in the range of about ambient to 1800°F. The ratio of free oxygen in the oxidant to carbon in the feedstock (O/C, atom/atom) is preferably in the range of about 0.7 to 1.5.

The feedstreams are introduced into the reaction zone of the fuel gas generator by means of fuel burner. Suitably, an annulus-type burner, such as described in co-assigned U.S. Pat. No. 2,928,460 issued to duBois Eastman et al., may be employed.

The feedstreams are reacted by partial oxidation without a catalyst in the reaction zone of a free-flow gas generator at an autogenous temperature in the range of about 1500° to 3500°F. and at a pressure in the range of about 10 to 180 atmospheres absolute (atm. abs.). The reaction time in the fuel gas generator is about 1 to 10 seconds. The mixture of effluent fuel gas leaving the gas generator may have the following composition (mole percent-dry basis) if it is assumed that the rare gases are negligible: CO 15–57, $H_2$ 73–15, $CO_2$ 1.5–20, $CH_4$ 0.0–20, $N_2$ 0–60, $H_2S$ nil to 2.0 and COS nil to 0.1. Unreacted particulate carbon (on the basis of carbon in the feed by weight) is about 0.2 to 20 weight percent from liquid feeds but is usually negligible from gaseous hydrocarbon feeds. The mole ratio ($CO/H_2$) dry basis of the effluent gas from the generator is at least 0.30 and preferably in the range of 0.30 to 1.5.

The stream of hot effluent fuel gas leaving the gas generator is passed into a separate refractory lined steel chamber, preferably at a temperature in the range of about 1500° to 3500°F. as produced in the gas generator and about the same pressure e.g. 10 to 180 atm. abs. and preferably 15 to 60 atm. abs. For example, spherical chamber 12, such as shown in the drawing and described in co-assigned U.S. Pat. No. 3,565,588 may be used. The spherical chamber is unpacked and free from obstruction to the flow of gas therein. A portion of the solid matter that may be entrained in the effluent stream of fuel gas drops out and may be removed by way of an outlet located at the bottom of the spherical chamber which leads to a lock hopper, i.e. flanged outlet 13 in the drawing.

When it is desired to further increase the mole ratio ($CO/H_2$) in the effluent gas stream, the following noncatalytic thermal reverse water-gas shift conversion step may be employed. A stream of supplemental $CO_2$-rich gas, as recovered subsequently in the process, is simultaneously introduced into the spherical chamber at a temperature in the range of about 500° to 1500°F. and at a pressure slightly above that in the gas generator. In such case on a dry basis, about 0.1 to 2.5 moles of supplemental $CO_2$ are preferably introduced into the spherical chamber per mole of effluent fuel gas from the gas generator. The gases mix and by noncatalytic thermal reverse water-gas shift reaction at a temperature of at least 1500°F., and preferably in the range of about 1500°–2800°F., the $CO_2$ reacts with a portion of the hydrogen in the effluent fuel gas stream from the generator so as to produce additional CO and $H_2O$. The mole ratio ($CO/H_2$) dry basis of the effluent stream of gas from the gas generator may be increased by this step from about 10–200 percent, and suitably about 15–50 percent. Thus, the effluent gas stream may leave the thermal shift zone with a mole ratio ($CO/H_2$) dry basis, in the range of greater than 0.3 to 6.0, preferably in the range of about 0.4 to 4.5 and advantageously greater than 1.5.

The aforesaid high temperature adiabatic noncatalytic thermal reverse water-gas shift reaction begins in the insulated spherical chamber and continues in the insulated line connecting the side outlet of the spherical chamber with the bottom flanged inlet to a waste heat boiler. Reference is made to coassigned U.S. Pat. No. 3,723,344. Thus the effluent stream of fuel gas is thermally shifted without a catalyst in transit between process stages. Residence time in the water gas shift conversion zone is in the range of about 0.1–5 Sec.

The aforesaid noncatalytic thermal reverse shift reaction takes place in a free-flow preferably adiabatic reaction zone, free from packing, which is separate from the fuel gas generator. Preferably, the conditions of temperature and pressure at which the reverse thermal shift reaction takes place are substantially the same as those in the fuel gas generator, less ordinary line drop and less any cooling due to the sensible heat of the supplemental $CO_2$ and the endothermic heat of reaction. Increasing the $CO/H_2$ ratio of the fuel gas will increase its heat of combustion per mole and increase its molecular weight.

Thus at 298°K:

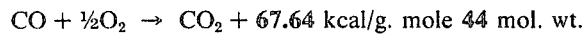
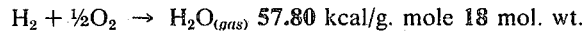

$CO + \frac{1}{2}O_2 \rightarrow CO_2 + 67.64$ kcal/g. mole 44 mol. wt.

$H_2 + \frac{1}{2}O_2 \rightarrow H_2O_{(gas)}$ 57.80 kcal/g. mole 18 mol. wt.

Advantageously, this improves the downstream thermal efficiency of the fuel gas and permits the use of smaller gas turbines.

The stream of effluent fuel gas is then passed through an inline waste heat boiler in noncontact heat exhange with water. The stream of fuel gas is thereby cooled to a temperature in the range of about 500° to 750°F. By-product steam may be produced thereby at a temperature in the range of about 450° to 700°F. for use elsewhere in the process. For example the aforesaid steam may be used as a working fluid in an expansion turbine for the production of power, for example to drive the compressor in a conventional air separation unit. Preferably, the steam is superheated to a temperature in the range of about 750° to 1200°F. by indirect heat exchange with clean flue gas leaving the gas turbine. The superheated steam may be used as the working fluid in a steam turbine, to be further described. Alternatively, the superheating may be accomplished in a furnace, preferably fired by part of the clean fuel gas, in order to avoid enviromental pollution.

The partially cooled stream of fuel gas leaving the waste heat boiler is passed into a gas cleaning zone where particulate carbon and any other entrained solids may be removed therefrom. Slurries of particulate carbon in a liquid hydrocarbon fuel may be produced in the cleaning zone which may be recycled to the fuel gas generator as at least a portion of the feedstock. Any conventional procedure suitable for removing suspended solids from a gas stream may be used. In one embodiment of the invention, the stream of fuel gas is introduced into a gas-liquid scrubbing zone where it is scrubbed with a scrubbing fluid such as liquid hydrocarbon or water. A suitable liquid-gas tray-type column is more fully described in Perry's Chemical Engineers' Handbook, Fourth Edition, McGraw-Hill 1963, Pages 18–3 to 5.

Thus, by passing the stream of process fuel gas up a scrubbing column in direct contact and countercurrent flow with a suitable scrubbing fluid or with dilute mixtures of particulate carbon and scrubbing fluid flowing down the column, the particulate carbon may be removed from the fuel gas. A slurry of particulate carbon and scrubbing fluid is removed from the bottom of the column and sent to a carbon separation or concentration zone. This may be done by any conventional means that may be suitable e.g., filtration, centrifuge, gravity settling, or by liquid hydrocarbon extraction such as the process described in the previously mentioned coassigned U.S. Pat. No. 2,992,906. Clean scrubbing fluid or dilute mixtures of scrubbing fluid and particulate carbon are recycled to the top of the column for scrubbing more fuel gas.

other suitable conventional gas cooling and cleaning procedures may be used in combination with or in place of the aforesaid scrubbing column. For example, the stream of fuel gas may be introduced below the surface of a pool of quenching and scrubbing fluid by means of a dip-tube unit. Or the stream of fuel gas may be passed through a plurality of scrubbing steps including an orifice-type scrubber or venturi or nozzle scrubber, such as shown in Perry's Chemical Engineers' Handbook, Fourth Edition, McGraw-Hill 1963, Pages 18–54 to 56.

Substantially no particulate carbon is produced with gaseous hydrocarbonaceous fuels, such as natural gas or methane. In such case, the aforesaid gas scrubbing step may not be necessary.

$H_2S$, COS, and $NH_3$ may be present in the effluent gas stream from the gas generator, depending upon the sulfur and nitrogen content of the hydrocarbonaceous feedstock to the gas generator. In a gas purification zone, $CO_2$, $H_2S$, COS, $H_2O$, $NH_3$ and other gaseous impurities may be removed from the cooled and cleaned stream of fuel leaving the gas cleaning zone. Suitable conventional processes may be used involving refrigeration and physical or chemical absorption with solvents, such as methanol, n-methylpyrrolidone, triethanolamine, propylene carbonate, or alternately with amines or hot potassium carbonate.

In solvent absorption processes, most of the $CO_2$ absorbed in the solvent may be released by simple flashing. The rest may be removed by stripping. This may be done most economically with nitrogen. Nitrogen may be available as a low cost by-product when a conventional air separation unit is used for producing substantially pure oxygen (95 mole percent $O_2$ or more) for use as the oxygen-rich gas in the fuel gas generator. The regenerated solvent is then recycled to the absorption column for reuse. When necessary, final cleanup may be accomplished by passing the process gas through iron oxide, zinc oxide, or activated carbon to remove residual traces of $H_2S$ or organic sulfide. If desired, a stream of $CO_2$-rich gas comprising $CO_2$ in the range of about 25–99 mole percent, and preferably more than 98.5 percent may be produced for use in the aforesaid noncatalytic thermal reverse water-gas shift step in the process. Optionally, a recovered stream of $CO_2$ may be recycled to the fuel-gas generator for use as all or a portion of the temperature-moderating gas. In such case, small amounts of $H_2S$ and COS may be contained in the $CO_2$ stream.

Similarly, the $H_2S$ and COS containing solvent may be regenerated by flashing and stripping with nitrogen, or alternatively by heating and refluxing at reduced pressure without using an inert gas. The $H_2S$ and COS are then converted into sulfur by a suitable process. For example, the Claus process may be used for producing elemental sulfur from $H_2S$ as described in Kirk-Othmer Encyclopedia of Chemical Technology, Second Edition Volumn 19, John Wiley, 1969, Page 353. Excess $SO_2$ may be removed and discarded in chemical combination with limestone, or by means of a suitable commercial extraction process. In general, the composition of the clean fuel gas in mole percent (dry basis) is about: $H_2$ 15 to 60, CO 15 to 60, $CH_4$ 0.0 to 25, $CO_2$ 0.0 to 5, $N_2$ 0.0 to 65. The heat of Combustion in BTU/SCF is at least 70, suitably 75–350, and preferably 75 to 150, i.e. 90.

The stream of clean fuel gas from gas purification zone at a temperature in the range of about 100° to 800°F. and at a pressure in the range of about 10 to 180 atm. abs. and preferably 15 to 60 atm. abs., and most preferably at a pressure substantially the same as that produced in the fuel gas generator less ordinary line drop is burned with air in the combustion chamber of a gas turbine.

When air is introduced into the combustion chamber of the gas turbine at a temperature in the range of about 400° to 750°F. and substantially the same pressure as the fuel gas, the clean flue gas leaving the combustion chamber at a temperature in the range of about 1400° to 3000°F. and usually 1600°F., and at a pressure in the range of about 50 to 1000 psig or higher and preferably 100 to 400 psig or higher has the following typical analysis in mole percent; $CO_2$ 4–20, $H_2O$ 4–20, $N_2$ 75–80, and $O_2$ 0–15. Only very small concentrations of oxides of nitrogen ($NO_x$) may be found in the flue gas. This is due to the comparatively low temperature in the combustion chamber, which is primarily the result of the comparatively low adiabatic flame temperature of the improved fuel gas. Further, the $SO_2$ content of the flue gas is nil; and entrained particulates are negligible.

The clean flue gas leaving the combustion chamber is passed through at least one power-developing expansion turbine as the working fluid. For example, coupled through a variable-speed drive to the axis of the turbine and driven thereby may be at least one electric generator and at least one turbocompressor. Air prior to introduction into the combustion chamber of the gas turbine, and carbon dioxide from the gas purification zone prior to to recycle to the fuel gas generator or to the aforesaid spherical mixing chamber may be compressed by means of said turbocompressors to the proper pressure e.g. over 10 to 180 atm. abs.

Recovery of the sensible heat in the clean flue gas which leaves the expansion turbine at a temperature in the range of about 800° to 1200°F. and a pressure in the range of about 1.0 to 7.0 atmospheres absolute may take place by heat exhange with steam what was produced in the waste heat boiler downstream from the gas generator. Superheated steam may be produced thereby having a temperature in the range of about 750° to 1200°F. The superheated steam may be used as the working fluid in an expansion turbine. The axial shaft of the steam turbine, for example, may be coupled through a variable drive to the shaft of a turbocompressor or to an electric generator or to both. The clean flue gas may be then compressed in said turbocompressor to a pressure in the range of over 10 to 180 atm. abs. and preferably at a temperature in the range of about 400° to 600°F. It may be then recycled to said fuel-gas generator as all or a portion of the temperature moderating gas. Alternatively, clean flue gas may be discharged into the atmosphere without causing pollution. Alternatively, the sensible heat in the flue gas leaving the expansion turbine may be recovered by preheating the air introduced into the combustion chamber of the gas turbine, by generating additional high-pressure steam, or by preheating boiler-feed water.

Optionally, the process fuel gas produced in the gas generator and cooled in the waste heat boiler may be used as the working fluid in an in-line power developing expansion turbine located for example after the waste-heat boiler, and suitably after the gas cleaning zone, or after the gas purification zone.

DESCRIPTION OF THE DRAWING

A more complete understanding of the invention may be had by reference to the accompanying schematic drawing which shows the previously described process in detail. Although the drawing illustrates a preferred embodiment of the process of this invention, it is not intended to limit the continuous process illustrated to the particular apparatus or materials described.

With reference to the drawing, free-flow non-catalytic refractory lined fuel gas generator 1 as previously described is equipped with axially aligned upstream flanged inlet port 2 and downstream flanged exit port 3. Annulus type burner 4, as previously described, with center passage 5 in alignment with the axis of gas generator 1 is mounted in inlet port 2. Passage 5 has an upstream end 6 and a conical shaped downstream end 7. A concentric coaxial annulus passage 8 with upstream inlet 9 and a downstream conical shaped discharge port 10 is also provided.

Connected to exit port 3 of gas generator 1 is flanged inlet port 11 of a refractory lined free-flow spherical shaped chamber 12. Chamber 12 has a downstream normally closed ash removal flanged outlet port 13, a side flanged inlet port 14, and a refractory lined side discharge duct 15 whose downstream end 16 is connected to waste-heat boiler 17. For example, water in line 18 is passed through tubing 19 within boiler 17 in indirect heat exchange with hot gases passing on the outside of the tubing. The water is vaporized and leaves as steam by way of line 20. Other suitable boilers may be used.

Hydrocarbonaceous feed in liquid or vapor form, as previously described, may be introduced into the system by way of line 25, valve 26, and line 27. Further, by means of pump 28, concentrated slurries of particulate carbon in water or liquid hydrocarbon fuels may be pumped from carbon separation zone 29 through lines 30, 31, valve 32, line 33 and into line 34 where mixing of the feedstreams may take place. The feed mixture is then introduced into the reaction zone 35 of gas generator 1 by way of two-way valve 180, lines 181, 182, inlet 9 and annulus passage 8 of burner 4.

A portion of the steam produced in waste heat boiler 17 may be passed into reaction zone 35 as a temperature moderating fluid by way of line 20, lines 36-38, valve 39, lines 40, 41, and center passage 5 of burner 4. A second portion of steam from boiler 17 may be used as the working fluid in a stream turbine. For example, the steam may be passed through lines 20, 36, 37, 45, 46, valve 47, and line 48 into expansion turbine 49. Exhaust steam leaves by line 183. Expansion turbine 49 drives turbocompressor 50 which compresses the air which enters by way of line 53. The compressed air may be then introduced into reaction zone 35 of gas generator 1 by way of lines 54, valve 55, lines 56, 57, valve 58 and lines 59, 41, and center passage 5 of burner 4. Alternatively when two air compression steps are required, the air from line 170 may be compressed in turbocompressor 168 and directed to compressor 50 through lines 183, 184, 185, and 52.

Optionally, all or a portion of the air from turbocompressor 50 may be replaced in gas generator 1 by substantially pure oxygen. Oxygen and nitrogen may be produced in an associated conventional air separation unit 42 from which substantially pure oxygen leaves by way of line 63 and nitrogen leaves by way of line 64. Nitrogen may be used subsequently in the process in gas purification zone 65. A portion of the steam produced in waste heat boiler 17 may be used indirectly to power air compressor 71. In such case the steam is passed through lines 20, 36, 37, 45, 66, valve 67, line 68, and through steam turbine 69 as the working fluid, leaving the line 70. Air is passed into coupled turbocompressor 71 by way of line 72. The air is compressed and then passed into air separation unit 42 by way of line 73. Oxygen in line 63 is compressed by steam driven reciprocating or centrifugal compresser 74 and then is passed through line 75, valve 76, lines 77-78 valve 79, lines 80, 41, and into center passage 5 of burner 4. Steam for driving compressor 74 may be obtained from boiler 17 by way of line 20, 36, 85, valve 86, and line 87.

Alternatively the air delivered to air separation unit 42 may be a slip stream (not shown) from turbocompressor 168. Power requirements for the air separation unit may be minimized by producing a free-oxygen containing gas comprising in mole percent $O_2$ 60–80 percent.

Preferably a portion of the steam from waste heat boiler 17 is superheated downstream in the process in heat exchanger 155 by indirect heat exchange with exhaust flue gas from line 154. In such case the steam is passed through lines 20, 88, valve 89, and line 90 into line 158. The superheated steam is the working fluid for steam turbine 161, to be further described.

Preferably, in place of or in combination with steam, the temperature moderating gas introduced into reaction zone 35 may be a $CO_2$-containing gas e.g., a clean flue gas produced subsequently in the process from line 100, or a $CO_2$-rich stream with or without a small amount of $H_2S$, COS from line 91, or a mixture of both. The $CO_2$-rich stream may be obtained subsequently in the process from gas purification zone 65 during purification of the effluent flue gas stream produced in gas generator 1. Thus, $CO_2$-rich stream leaving gas purification zone 65 by way of line 91 may be compressed in turbocompressor 92, and then passed into reaction zone 35 of gas generator 1 by way of lines 93, 94, valve 95, lines 96, 57, valve 58, lines 59, 41, and center passage 5 of burner 4. Preferably, a portion of said $CO_2$-rich stream may be introduced into spherical mixing chamber 12 by way of line 97, valve 98, line 99 and flanged inlet 14 where reverse noncatalytic thermal water-gas shift takes place with a portion of the hydrogen in the effluent fuel gas leaving gas generator 1, thereby increasing the mole ratio ($CO/H_2$) of the process fuel gas stream.

As previously mentioned, preferably clean flue-gas produced subsequently in the process in line 100 may be introduced into reaction zone 35 of gas generator 1 as the temperature moderator. For example, it may be introduced by way of line 101, valve 102, lines 103, 78, valve 79, lines 80, 41, and center passage 5 of burner 4. Free-oxygen containing gas from line 77 may be mixed with the flue gas in line 78. Alternatively, the clean flue-gas may be introduced into the reaction zone in admixture with hydrocarbonaceous feed. For example, the clean flue gas in line 100 is passed through line 104, and mixed in line 105 with hydrocarbonaceous fuel from line 106. The mixture may be heated in heater 107 and discharged into gas generator, as a gasiform material via lines 108, 182, and annulus 8.

The effluent fuel gas produced in reaction zone 35 of gas generator 1, mixed with $CO_2$ in spherical chamber 12 and thermally shifted therein and also in duct 15 is cooled in waste heat boiler 17. The cooled process gas stream is passed into a conventional gas cleaning zone 110 by way of lines 111, 112, valve 113, lines 114, 115, and flanged inlet 116. Optionally, all or a portion of the partially cooled effluent gas stream may be used as the working fluid in one or more expansion turbines located in different points in the system, e.g. before or after the gas cleaning zone 110 or the gas purification zone 65. For example, the effluent stream of raw fuel gas in line 111 may be passed through line 117, valve 118, and line 119 into expansion turbine 120. The fuel gas leaving turbine 120 is passed through line 121, valve 122, lines 123, 115 and flanged inlet 116. Turbocompressors 124, and 125 are driven by expansion turbine 120 and may be used to compress other fluids in the system. For example, nitrogen may be introduced into compressor 124 by way of line 126 and discharged by line 127. Air may be introduced into compressor 125 by way of line 128 and discharged by way of line 129.

Raw effluent fuel gas from fuel gas generator 1 that is partially cooled in waste heat boiler 17 is cooled further and cleaned in gas cleaning zone 110 by being directly contacted and scrubbed with clean srubbing fluid or a recycled and dilute slurry of particulate carbon and scrubbing fluid. The clean scrubbing fluid may be introduced into the gas cleaning zone by way of line 134, valve 135, and lines 136 and 137. For example, the gas cleaning zone may be a vertical scrubbing column with a plurality of horizontal trays. In such instance as the gas passes up through the tower, it is contacted on each tray by a scrubbing fluid, e.g., water or liquid hydrocarbon flowing by gravity down the tower. Particulate carbon is thereby scrubbed from the fuel gas. The fuel gas becomes progressively cleaner as it passes up the scrubbing column while the concentration of particuclate carbon in scrubbing fluid becomes progressively greater as it passes down the column. The slurry of particulate carbon and scrubbing fluid passes out from the bottom of scrubbing column 110 and and into a carbon separation zone 29 by way of line 138.

In carbon separation zone 29, the slurry of particulate carbon and scrubbing fluid may be processed in a conventional manner as previously described to produce a stream of clean scrubbing fluid, and a separate slurry stream of particulate carbon in a liquid vehicle. Thus, from line 138 of gas cleaning zone 110 a slurry comprising about 2 wt. percent of particulate carbon in water is mixed with naphtha and introduced into a decanter (not shown) in carbon separation zone 29. A dispersion of particulate carbon and naphtha is formed and clean water is drawn off from the decanter and recycled as at least a portion of the scrubbing fluid to gas cleaning zone 110 by way of line 140, pump 139 and line 141 and 137. Fresh heavy liquid hydrocarbon fuel oil from line 43 is introduced into a distillation column (not shown) in carbon separation zone 29 along with the particulate carbon-naphtha dispersion from the decanter. Naphtha is removed from the top of the distillation column and recycled for extracting more water from the particulate carbon slurry. By means of pump 28 a preheated slurry of particulate carbon and heavy liquid hydrocarbon fuel oil from the bottom of the distillation column may be pumped through lines 30, 31, valve 32, lines 33, 34, valve 180, lines 181, 182, inlet 9, and annulus passage 8 into reaction zone 35 of gas generator 1 as previously described.

The stream of clean fuel gas leaving gas cleaning zone 110 is introduced into a conventional gas purification zone 65 by way of line 42. $H_2S$ and COS are removed from the fuel gas and leave separation zone 65 by way of line 143. In Claus Unit 144, the $H_2S$ is burned with air from line 145 to produce solid sulfur for export in line 146 and water in line 147. Excess nitrogen and other non polluting gaseous impurities may be vented by way of line 148.

Clean fuel - gas in line 149 is introduced into combustion chamber 150 of the gas turbine and burned with compressed air from line 151 to produce clean flue-gas which leaves combustion chamber 150 by way of line 152. The clean flue gas is passed through main expansion turbine 153 and then through line 154, heat exhanger 155, line 156, turbocompressor 157, and line 100. As previously described, optionally the compressed clean flue-gas in line 100 may be recycled to the fuel gas generator 1 as well or a portion of the temperature moderating gas. Also, the sensible heat in the clean flue-gas is preferably recovered by heat exhange with steam which enters heat exchanger 155 by way of line 158 and then leaves as super-heated steam by way of line 159. This superheated steam may be passed into steam turbine 161 as the working fluid, and then out through line 157 and turboelectric generator 166. These units may be connected by fluid coupling 160.

Expansion turbine 153 may be used to provide power for turboelectric generator 167, turbocompressor 92, and turbocompressor 168. Variable speed coupling may be provided to link the units, e.g., fluid coupling 169. Air enters turbocompressor 168 from line 170. As previously described, the compressed air is passed into combustion chamber 150, and alternately into fuel gas generator 1.

Alternatively, the relatively low-temperature heat which can be recovered from the gas-turbine cycle e.g. stream of flue-gas in line 154, can be used as an energy source for absorption refrigeration. This refrigeration could then be employed for air separation and $CO_2$ removal by condensation or by absorption in a solvent at low temperature. The aforesaid flue-gas may also be used for preheating the feedstreams of the gas generator, or preheating the scrubbing fluid going into the gas cleaning zone. The low-temperature heat could also be used for regenerating liquid absorbents for $CO_2$, such as MEA and $K_2CO_3$ solution.

Turbine driven electric generators 166 and 167 may provide electric power for driving essential mechanical and electrical equipment and instruments in the process including the gas-generation and air separation systems. Excess electric-power may be exported. This design has a major practical advantage in making operation of the plant independent from outside electric-power sources.

EXAMPLE

The following example illustrates preferred embodiments of the process of this invention pertaining to the producing of an improved fuel gas and burning said fuel gas in a gas turbine which is integrated in the system. While preferred modes of operation are illustrated, the example should not be construed as limiting the scope of the invention. The process is continuous and the flow rates are specified on an hourly basis for all streams of materials.

113,700 standard cubic feet (SCF) of improved fuel gas are produced by the subject process including partial oxidation of an hydrocarbonaceous fuel to be further described with air in a conventional vertical non-catalytic free-flow refractory-lined fuel gas generator. Exhaust flue gas from a gas turbine located downstream in the process is introduced into the reaction zone to moderate the temperature therein. The fuel gas is produced at an autogenous temperature of about 2,575°F. and at a pressure of about 24 atmospheres absolute. The average residence time in the gas generator is about 3 seconds. The fuel gas leaving the generator has the following composition in mole percent: CO 23.77, $H_2$ 15.82, $CO_2$ 1.44, $H_2O$ 2.67, $N_2$ 55.38, $CH_4$ nil, Ar 0.71, $H_2S$ 0.20, COS 0.01. About 45.3 pounds of unconverted particulate carbon are entrained in the effluent stream of fuel gas. The molecular weight of the dry fuel gas after $CO_2$ and $H_2S$ are removed is 23.8 and the net or lower heat of combustion is 124.9 BTU/SCF.

The aforesaid fuel gas is produced by continuously introducing into a partial oxidation fuel gas generator by way of an annulus type burner the following charge: a hydrocarbonaceous fuel consisting of 1045.3 pounds of a pumpable slurry produced subsequently in the process. The slurry is preheated to a temperature of about 300°F. and comprises 45.3 pounds of particulate carbon and 1000 pounds of reduced crude oil having the following ultimate analysis (wt. %) C 86.1 percent, $H_2$ 11.0 percent, S 2.0 percent, $N_2$ 0.8 percent, and ash 0.01. Further, the reduced crude oil has an API gravity of 10.9, a heat of combustion of 18,200 BTU per pound, and a viscosity of 822 Saybolt Seconds Furol at 122°F. Also, 74,350 SCF of air at a temperature of 600°F. in admixture with 6580 SCF of said flue gas are introduced into the reaction zone of the gas generator by way of said burner.

All of the hot effluent fuel gas leaving the gas generator is passed through a refractory-lined spherical free-flow chamber located at the downstream exit of the fuel gas generator. A portion of the entrained solids drop out of the stream of fuel gas and are removed by way of a port located in the bottom of the spherical chamber. By means of a waste heat boiler and indirect heat exchange with water as a coolant, the stream of fuel gas is cooled to a temperature of about 800°F. Simultaneously, steam at a temperature of about 800°F is produced in the waste heat boiler. A portion of the steam may be used to operate gas compressors in a conventional air separation unit for producing substantially pure oxygen and nitrogen. Optionally, the oxygen may be introduced into the gas generator, and the nitrogen may be introduced into a gas purification zone located downstream in the process to effect separation of the gaseous impurities.

Substantially all of the particulate carbon and any remaining solids are removed from the stream of fuel gas in a conventional gas-liquid scrubbing column. A slurry of particulate carbon and crude oil is produced and introduced into the gas generator as feedstock, as previously described. $CO_2$, $H_2S$, COS, and optionally $H_2O$, are removed from the stream of fuel gas in a gas purification zone, and a stream of improved clean fuel gas is produced substantially having the following composition in mole percent $H_2$ 16.53, CO 24.84, $N_2$ 57.88 and A 0.75. The stream of clean fuel gas is introduced into the combustion chamber of a gas turbine at a temperature of about 750°F. and a pressure of about 20 atmospheres. Simultaneously, air at substantially the same temperature and pressure and optionally $H_2O$ are passed into the combustion chamber and the fuel gas is combusted. Clean flue gas at a temperature of about 2000°F., and a pressure of about 15 atmospheres, is produced comprising in mole percent $CO_2$ 4.7, $H_2O$ 5.7, $N_2$ 75.4, Ar 1.0 and $O_2$ 13.2. The clean flue gas is passed through an expansion turbine which produces about 1,546 horsepower-hours. Coupled to the shaft of the turbine and driven thereby is an electric generator and a compressor for compressing the air delivered to the combustion chamber of the gas turbine and to the fuel gas generator.

The clean flue gas discharged from the expansion turbine at a temperature of about 1050°F. and a pressure of about 1.5 atmosphere absolute is passed through a heat exchanger in indirect heat exchange with steam produced previously in the waste heat boiler downstream from the fuel gas generator. Superheated steam at a temperature of 1,000°F. is thereby produced. This superheated steam is passed through a steam turbine producing horse power. Coupled to the steam turbine and driven thereby are an electric generator and a compressor for compressing the exhaust flue gas to a pressure above that of said fuel gas generator. 6580 SCFH of flue gas at a temperature of 600°F are mixed with said air as previously described and introduced into the fuel gas generator. Alternatively, the sensible heat in said stream of flue gas may be recovered by preheating the stream of air being introduced into the combustion chamber of the gas turbine.

To demonstrate an embodiment of the invention in which a portion of the $CO_2$ recovered in the gas purification zone is utilized in improving the composition of the fuel gas by increasing its molecular weight and heat of combustion, 30,200 SCF of $CO_2$-rich gas containing more than 95 mole percent $CO_2$ from the gas purification zone are compressed by a turbocompressor driven by the main gas turbine to a pressure slightly above that in the fuel gas generator. At a temperature of about 600°F. the compressed stream of $CO_2$ is introduced into a free-flow refractory lined vessel, such as spherical vessel 12 in the drawing, and mixed therein with 113,700 SCF of effluent fuel gas leaving the gas generator at a temperature of about 2575°F.

Noncatalytic adiabatic thermal reverse water-gas shift reaction between $CO_2$ and $H_2$ takes place in free flow refractory lined chamber 12 and line 15 to increase the mole ratio ($CO/H_2$) of the process gas stream flowing therein. An improved fuel gas is procuded having following composition in mole percent: CO 25:38, $H_2$ 6.23, $CO_2$ 14.91, $H_2O$ 8.53, $N_2$ 44.21, $CH_4$ 0.0, Ar 0.57, $H_2S$ 0.16, COS 0.01. The molecular weight of the thermally shifted dry fuel gas after $CO_2$ and $H_2S$ are removed is increased to 25.97. Further, the net or lower heat of the combustion per mole is increased to 128.8 BTU/SCF.

The process of the invention has been described generally and by examples with reference to hydrocarbonaceous feedstocks and scrubbing fluids of particular compositions for purposes of clarity and illustration only. From the foregoing it will be apparent to those skilled in the art that various modifications of the pro-

We claim:

1. A process for the generation of power by means of a gas turbine having a combustion chamber and an expansion turbine comprising:

1. reacting a hydrocarbonaceous fuel with a free-oxygen containing gas by partial oxidation in the presence of a temperature moderator selected from the group consisting of at least a portion of the $CO_2$-rich gas stream from step (3), at least a portion of the exhaust flue gas from step (4), and mixtures thereof in the reaction zone of a noncatalytic free-flow gas generator at an autogenous temperature in the range of about 1500°F to 3500°F and a pressure in the range of about 10 to 180 atmospheres absolute to produce an effluent gas stream comprising mixtures of $H_2$, CO, $CO_2$ and $H_2O$ and one or more of the members of the group $N_2$, $CH_4$, COS, $H_2S$ and Ar, and particulate carbon; and wherein the mole ratio ($CO/H_2$) dry basis of the effluent gas from the generator is at least 0.30;
   2. cooling the effluent gas from (1) by indirect heat exchange with water thereby producing steam;
   3. introducing the cooled effluent gas from (2) into a gas cleaning and purification zone and separately obtaining therefrom a stream of clean fuel gas comprising mixtures of $H_2$ and CO and one or more members of the group $CH_4$, $N_2$, $H_2O$, and $CO_2$; a $CO_2$-rich gas stream; a slurry stream comprising particulate carbon in a liquid vehicle; and optionally a gas stream comprising $H_2S$ and COS; and
   4. burning the stream of clean fuel gas from (3) with air in the combustion chamber of said gas turbine and passing the resulting flue gas as the working fluid through said expansion turbine to develop power and to produce exhaust flue gas.

2. The process of claim 1 further provided with the steps of compressing air to a pressure in the range of about 10 to 180 atmospheres absolute by means of a compressor driven by the expansion turbine in step (4), and introducing the compressed air into the combustion chamber in step (4) as the air specified therein.

3. The process of claim 1 further provided with the steps of compressing free-oxygen containing gas to a pressure above that in the gas generator in step (1) by means of a compressor driven by the expansion turbine in step (4) and introducing the compressed free-oxygen containing gas into said gas generator as the free-oxygen containing gas specified therein.

4. The process of claim 1 further provided with the steps of driving an electric generator by means of the expansion turbine in step (4) and producing electricity.

5. The process of claim 1 further provided with the steps of compressing a portion of the $CO_2$-rich gas stream from step (3) to a pressure above that in the gas generator in step (1) by means of a compressor driven by the expansion turbine in step (4), mixing the compressed $CO_2$-rich gas stream with the effluent gas stream from (1), and in a free-flow thermal shift conversion zone subjecting the resulting mixed gas stream to noncatalytic thermal reverse water-gas shift reaction at a temperature of at least 1500°F. to increase the $CO/H_2$ mole ratio to a value (dry basis) in the range of about greater than 0.3 to 6.0.

6. The process of claim 1 further provided with the steps of superheating a portion of the steam from step (2) by indirect heat exchange with the flue gas exhaust from the expansion turbine of step (4) passing at least a portion of said superheated steam through a steam turbine as the working fluid, and driving a compressor or an electric generator by means of said steam turbine.

7. The process of claim 1 further provided with the step of passing the cooled effluent gas stream from step (2), at a pressure substantially that of said generator less ordinary line drop, through an expansion turbine located upstream from said gas turbine.

8. The process of claim 1 wherein the free-oxygen containing gas in step (1) is selected from the group consisting of air, oxygen-enriched air (more than 21 mole percent $O_2$) and substantially pure oxygen (more than 95 mole percent $O_2$).

9. The process of claim 1 wherein said hydrocarbonaceous fuel is a liquid hydrocarbon selected from the group consisting of liquefied petroleum gas; petroleum distillates and residues, gasoline, naphtha, kerosine, crude petroleum, asphalt, gas oil, residual oil, tar-sand oil, shale oil, coal oil; aromatic hydrocarbons such as benzene, toluene, xylene fractions coal tar, cycle gas oil from fluid-catalytic-cracking operation; furfural extract of coker gas oil; and mixtures thereof.

10. The process of claim 1 wherein said hydrocarbonaceous fuel is a gaseous hydrocarbon selected from the group consisting of methane, ethane, propane, butane, pentane, natural gas, water gas, coke-oven gas, refinery gas, acetylene tail gas, ethylene off-gas, and mixtures thereof.

11. The process of claim 1 wherein said hydrocarbonaceous fuel is an oxygenated hydrocarbonaceous organic material selected from the group consisting of carbohydrates, cellulosic materials, aldehydes, organic acids, alcohols, ketones, oxygenated fuel oil, waste liquids and by-products from chemical processes containing oxygenated hydrocarbonaceous organic materials and mixtures thereof.

12. The process of claim 1 wherein said hydrocarbonaceous fuel is a pumpable slurry of solid carbonaceous fuels selected from the group consisting of coal, particulate carbon, petroleum cokes, concentrated sewer sludge in a vaporizable carrier such as water, liquid hydrocarbon fuel and mixtures thereof.

13. The process of claim 1 further provided with the step of preheating the hydrocarbonaceous fuel to a temperature up to 1200°F. but below its cracking temperature proir to introducing said fuel into the gas generator in step (1).

14. The process of claim 1 further provided with the steps of introducing at least a portion of said steam from step (2) into a steam turbine driving a turbocompressor, compressing air in said turbocompressor, introducing said compressed air into an air separation unit in which oxygen and nitrogen are separated from the air feed, and compressing at least a portion of said oxygen and introducing same into said gas generator as at least a portion of said free-oxygen-containing gas.

15. The process of claim 14 further provided with the step of introducing at least a portion of said separated nitrogen into the gas purification zone of step (3) to aid in the separation of said streams.

16. The process of claim 1 wherein $H_2O$ is passed through burner into the reaction zone in step (1).

17. A process for the generation of power by means of a gas turbine wherein a hydrocarbonaceous fuel is gasified to produce a fuel gas which is burned in a combustion chamber to produce a flue gas which is introduced into a power-developing expansion turbine, the improvement which comprises
  1. reacting by partial oxidation a liquid hydrocarbon fuel with a free-oxygen containing gas by partial oxidation in the presence of a temperature moderating gas selected from the group consisting of at least a portion of the $CO_2$-rich gas stream from step (4), at least a portion of the exhaust flue gas leaving the expansion turbine in step (6), $H_2O$ and mixtures thereof, said reaction taking place in the reaction zone of a non-catalytic free-flow gas generator at an autogenous temperature in the range of about 1500° to 3500°F. and at a pressure in the range of about 10 to 180 atmospheres absolute to produce an effluent gas stream comprising $H_2$, CO, $CH_4$, $CO_2$, $H_2O$, and $N_2$ and minor amounts of COS, $H_2S$, Ar, and particulate carbon; and wherein the mole ratio ($CO/H_2$) dry basis of the effluent gas from the generator is at least 0.30;
  2. mixing a supplemental $CO_2$-rich gas stream produced subsequently in the process with the effluent gas stream from (1) and in a free-flow thermal shift conversion zone subjecting the resulting mixed gas stream to non-catalytic thermal reverse water-gas shift reaction at a temperature of at least 1500°F., thereby increasing the mole ratio ($CO/H_2$) dry basis of the effluent gas stream from (1);
  3. cooling the effluent gas from (2) by indirect heat exchange with water thereby producing steam;
  4. introducing the cooled effluent gas from (3) into a gas cleaning and purification zone and separately obtaining therefrom a stream of improved fuel gas comprising $H_2$, CO, and optionally $N_2$ and $CH_4$; a $CO_2$-rich gas stream; a slurry stream comprising particulate carbon and a liquid carrier; and a gas stream comprising $H_2S$ and COS;
  5. introducing at least a portion of the $CO_2$-rich gas stream from (4) into (2) as said supplemental $CO_2$-rich stream;
  6. burning the improved stream of fuel gas from (4) with air in said combustion chamber and passing the resulting flue gas as the working fluid through said power-developing expansion turbine; and
  7. passing a portion of the steam produced in (3) in direct heat exchange with exhaust flue gas leaving the expansion turbine in step (6) to produce superheated steam, and using said superheated steam as the working fluid in a power-developing steam turbine.

18. The process of claim 17 provided with the added step of compressing a portion of the exhaust flue gas leaving step (7) in a compressor driven by the steam turbine in step (7) to a pressure greater than that in the said gas generator and introducing the compressed flue gas into the gas generator in step (1) as said temperature moderating gas.

19. The process of claim 17 further provided with the step of compressing a portion of the $CO_2$-rich gas stream from step (4) to a pressure greater than that of said gas generator and introdcing the compressed gas into the gas generator in step (1) as said temperature moderating gas.

20. The process of claim 17 further provided with the step of compressing air in a compressor driven by the expansion turbine in step (6) to a pressure greater than that in said gas generator, and introducing said compressed air into the gas generator in step (1), as at least a portion of said free-oxygen containing gas.

21. The process of claim 17 further provided with the step of compressing air in a compressor driven by the expansion turbine in step (6), and introudcing said compressed air into the combustion chamber as the air specified in step (6).

22. The process of claim 17 whereby the improved fuel gas stream separated in step (4) has a Heat of Combustion in the range of about 75 to 350 BTU/SCF.

23. The process of claim 17 where the pressure in the system up through the combustion chamber in step (6) is substantially the same as that in the gas generator in step (1) less ordinary pressure drop in the line.

24. The process of claim 17 with the addition of steam to the combustion chamber in step (6).

* * * * *

PO-1050
(5/69)

UNITED STATES PATENT OFFICE
CERTIFICATE OF CORRECTION

Patent No. 3,868,817      Dated March 4, 1975

Inventor(s) CHARLES P. MARION, WARREN G. SCHLINGER, ALBERT BRENT JAMES P. MUENGER It is certified that error appears in the above-identified patent and that said Letters Patent are hereby corrected as shown below:

Col. 8 line 17      Change "1600°F" to --1600°F-2000°F--

Col. 12, line 8      Change "42" to --142--

Col. 18 lines 20 and 31      Change "introuducing" to --introducing--

Signed and Sealed this seventeenth Day of February 1976

[SEAL]

Attest:

RUTH C. MASON
*Attesting Officer*

C. MARSHALL DANN
*Commissioner of Patents and Trademarks*